United States Patent [19]

Rolland

[11] Patent Number: 4,518,849

[45] Date of Patent: May 21, 1985

[54] ELECTRONIC TOASTER TIMER WITH PRECEDING OFF-TIME TEMPERATURE CONTROL COMPENSATION

[75] Inventor: Gerard T. Rolland, Brewerton, N.Y.

[73] Assignee: SSAC, Inc., Liverpool, N.Y.

[21] Appl. No.: 432,123

[22] Filed: Sep. 30, 1982

[51] Int. Cl.³ .............................................. H05B 1/02
[52] U.S. Cl. .................... 219/492; 219/494;
 219/514; 323/288; 99/327; 99/332
[58] Field of Search .............. 219/492, 493, 501, 505,
 219/494, 497, 514, 518; 323/242, 288, 326, 243;
 99/327, 328, 329 R, 332

[56] References Cited

U.S. PATENT DOCUMENTS

| 3,431,400 | 3/1969 | Iida et al. | 219/505 |
| 3,894,282 | 7/1975 | MacFarland | 219/492 |
| 4,225,777 | 9/1980 | Schindler | 323/243 |
| 4,339,649 | 7/1982 | Hronchek | 219/492 |
| 4,378,486 | 3/1983 | Yunik et al. | 219/492 |
| 4,395,621 | 7/1983 | Parker | 219/492 |

Primary Examiner—M. H. Paschall
Attorney, Agent, or Firm—Harvey B. Jacobson

[57] ABSTRACT

The duration of the timing cycle of a selector adjusted timer controlling intermittant operation of a heating element in an electrical appliance, is reduced as an inverse function of the duration of a preceding off-time interval. A manually operable switch which turns on the appliance, simultaneously triggers operation of the timer to determine the duration of the off-time intervals affecting the compensating action reducing the duration of the timing cycle.

13 Claims, 3 Drawing Figures

ELECTRONIC TOASTER TIMER WITH PRECEDING OFF-TIME TEMPERATURE CONTROL COMPENSATION

BACKGROUND OF THE INVENTION

This invention relates in general to automatic timers for electrical appliances and in particular to timers associated with electrical toasters for bread slices or the like.

Timer mechanism for electrical toaster are, of course, well known. Generally, a darkness selecting adjustment device is associated with the toaster appliance usually operative through the timer mechanism to select the duration of the on-time interval for the toaster heater element designed to impart a desired toasting darkness or color to the bread slice being toasted. However, with successive use of the toaster, its temperature status at the beginning of any timed toasting cycle will vary between room temperature and a maximum heat saturation temperature. Such variation will depend on the duration of the preceding off-time interval. Accordingly, toasting darkness selection made through the timer adjustment device often is not reliable. When the darkness selector is initially adjusted, the toaster is cooled to room temperature so that a predetermined transfer of heat occurs during an operational cycle to produce a desired toasting color. If the toaster is operated again following a short off-time interval, it is still quite hot so that the heat transferred is greater for the same duty cycle duration resulting in a darker toasting color. The degree to which the darkness varies from the initial selection depends on the indeterminate duration of the off-time intervals between successive toaster operations and often necessitates changing the setting of the darkness selector and discarding undesirable toasted items.

Various solutions to the foregoing problem come to mind including the provision of automatic heater temperature and timer controls. Generally, such solutions are costly, unreliable and not economically feasible. It is therefore an important object of the present invention to provide a more reliable and economically feasible method and means for minimizing changes in the performance of electrical appliances such as toasters arising because of variations in off-time intervals between successive operations.

SUMMARY OF THE INVENTION

In accordance with the present invention, the variation in heat transfer from the electrical heating element that occurs during heater on-time intervals of selected duration is minimized despite random changes in off-time duration between successive operation of the appliance, by an automatic compensating action on the appliance timer controlling on-time energization of the heating element. Accordingly, the compensating action involves reducing the duration of the on-time intervals of an electrical toaster in order to take into account its temperature status at the instant a toasting operation is initiated. Toward that end, the reduction of on-time duration is an inverse function of the duration of an off-time interval preceding each on-time interval. The time reducing action is furthermore applied to a timer set by the darkness selector device associated with the toaster appliance so as to minimize variations from a selected toasting color that would otherwise occur.

The foregoing timer conpensating action of the present invention is applicable to appliances by utilizing an electronic timer programmed to meet the temperature saturation and heat dissipation characteristics of the particular appliance model involved. The timer compensating means features, a storage capacitor that is charged in parallel with the timing capacitor, at a rate controlled by the selector-operated timer adjustment device, to a threshold voltage level. The storage capacitor is then discharged at a predetermined delay rate during a following off-time interval to a discharged state at a variable level which will depend on the duration of the off-time interval. Thus, for a short off-time interval the capacitor will be only partially discharged when a following on-time cycle is initiated so as to reduce the time for recharge to the threshold level and the corresponding on-time duration. The time reducing delay in capacitor discharge will occur between minimum and maximum limits. The foregoing compensating action thus occurs independently of switching action by direct and continuous conditioning of the timer during each off-time interval.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF EMBODIMENT

Figure 1:
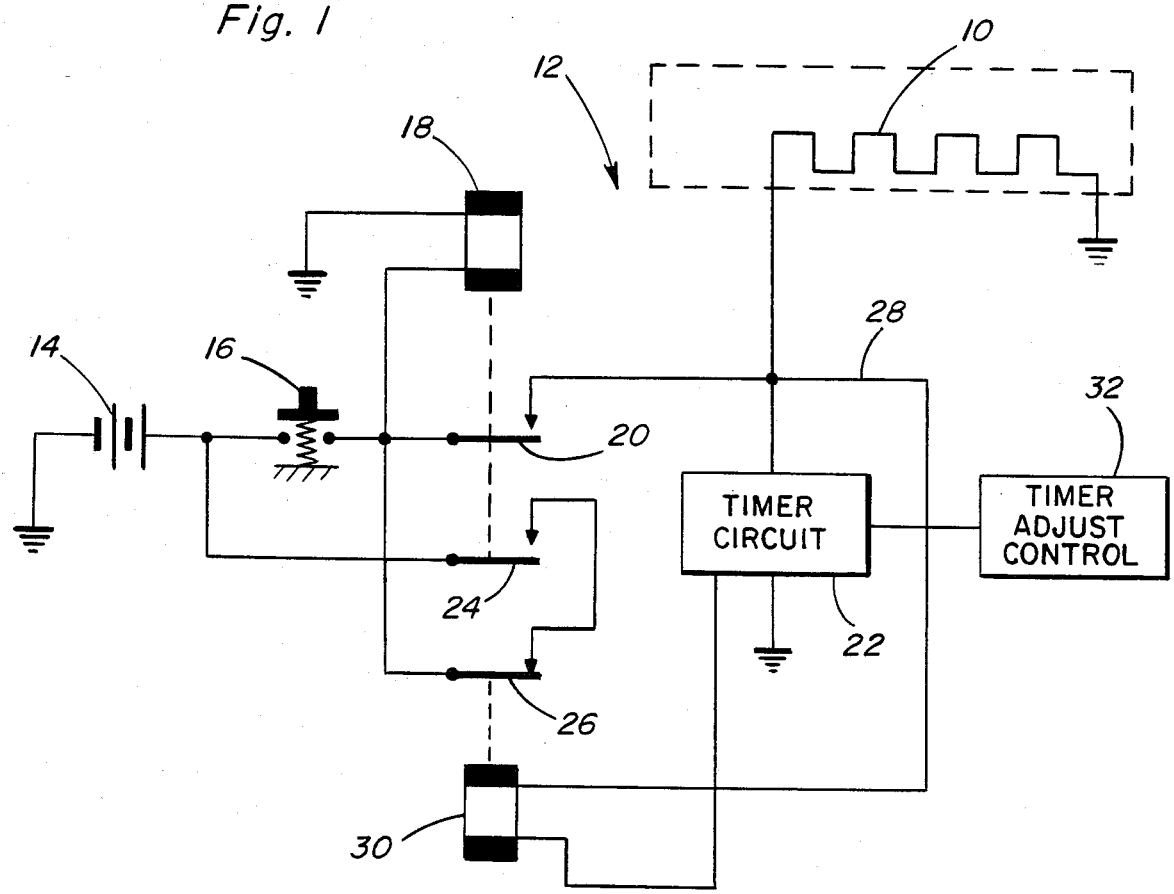
FIG. 1 is a simplified and exemplary circuit diagram with which the timer circuit of the present invention is associated.

Referring now to the drawings in detail, FIG. 1 illustrates a typical timer controlled power circuit for an electrical load such as the heater element 10 in an electric toaster or like appliance diagrammatically shown and designated by reference numeral 12. A source of operating voltage symbolically shown and designated 14 in FIG. 1, is shown connected to the usual, manually actuated power control switch 16 of the appliance. Upon momentary closing of switch 16, the relay coil 18 of the power control circuit is energized to close a normally open relay power switch 20 through which operating voltage is applied to trigger operation of a timer circuit 22 and energize the heater load 10. At the same time, normally open relay holding switch 24 is closed to complete a relay holding circuit through a normally closed, series connected relay switch 26 between the voltage source and the relay coil 18, by-passing the manual power switch 16. Accordingly, the load 10 and timer circuit 22 remain energized upon release and opening of switch 16.

At the end of a timing cycle initiated by the momentary closing of manual power switch 16, voltage is applied through output voltage line 28 from the timer 22 to a release relay coil 30 to open relay switch 26. Upon opening of relay release switch 26, the relay holding circuit for relay coil 18 is interrupted to remove operating voltage from the load 10 and timer 22 by opening of relay power switch 20 and relay holding switch 24. The duration of the timing cycle of timer 22 will therefore control heater on-time and the toasting color corresponding thereto in the case of an electric toaster. A timer adjustment control 32 associated with the appliances is connected to the timer circuit to enable the user of the toaster to select the desired toasting darkness or color.

Figure 2:
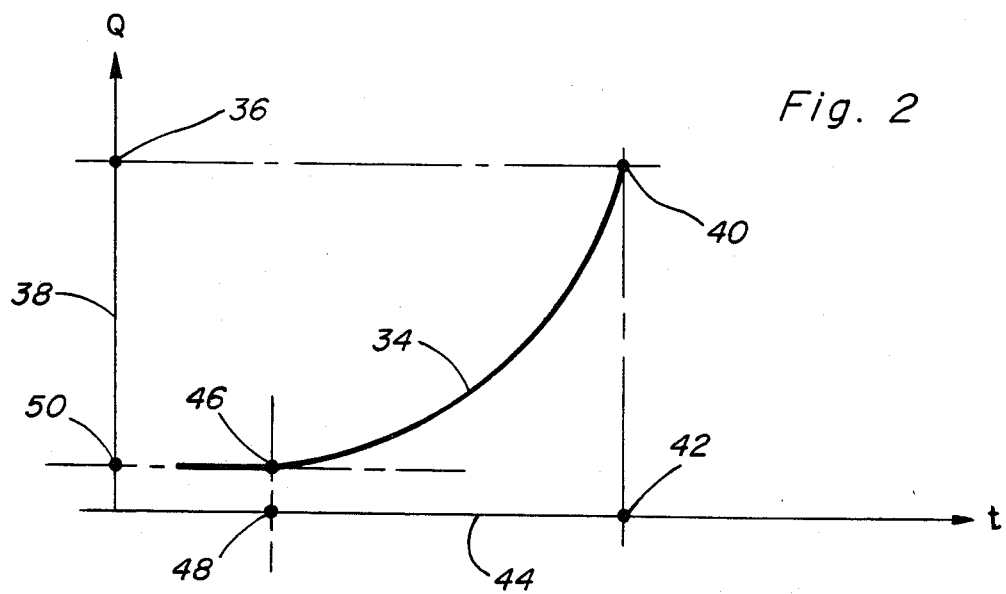
FIG. 2 is a graphical illustration of certain heat transfer characteristics associated with the present invention.

As graphically shown in FIG. 2, a typical curve 34 depicts the variation in timing cycle duration (Q) necessary to maintain a given selected toasting color as a function of the off-time interval (t) between heater operations, randomly varied under control of manual actuations of switch 16. The maximum timer cycle duration capable of being selected by the control 32, is denoted at 36 on the ordinate 38 and point 40 on curve 34 corresponding to a maximum off-time interval 42 on abscissa 44. Curve 34 from a minimum time interval point 46 remains constant at a minimum cycle duration limit 50 below off-time interval 48. The timer circuit 22 in accordance with the present invention will be automatically conditioned to vary the duration of the timer cycle, for any given setting of the timer adjustment control 32, as an inverse function of the off-time interval, such inverse function being depicted by curve 34 in FIG. 2.

Figure 3:
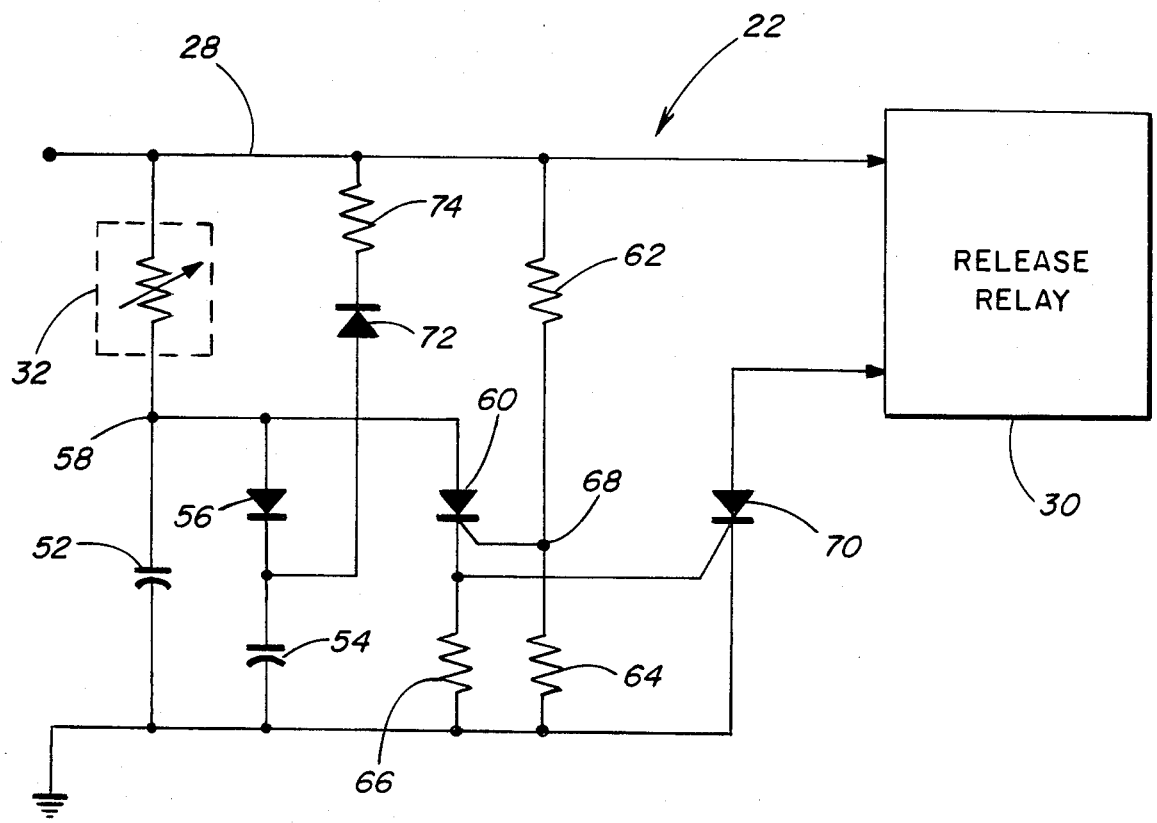
FIG. 3 is a circuit diagram of one embodiment of a timer circuit in accordance with the present invention.

FIG. 3 illustrates one embodiment of the timer circuit 22 connected to voltage supply line 28 for carrying out the objectives of the present invention. A timing cycle is initiated when power is applied to the voltage line 28 as aforementioned, causing capacitors 52 and 54 to charge at a rate dependent on the setting of control 32. Capacitor 52 is directly connected in series with control 32 between line 28 and ground while diode 56 connects capacitor 54 in series with control 32 between line 28 and ground. When the voltage at junction 58 between control 32 and capacitor 54 to which diode 56 is connected, reaches a threshold value determined by silicon controlled rectifier (SCR) 60, and voltage dividing resistors 62 and 64, the SCR 60 is turned on and capacitor 52 is discharged therethrough. Such discharge of capacitor 52 occurs at a rate determined by resistor 66 connected in series with SCR 60 between junction 58 and ground. The control electrode of SCR 60 is connected to the junction 68 between the voltage dividing resistors 62 and 64 to set the threshold level. Diode 56 prevents discharge of capacitor 54 through the same discharge path as capacitor 52. The discharge of capacitor 52 through SCR 60 causes SCR 70 to turn on and ground the release relay 30 thereby terminating the timing cyle by removal of voltage from line 28 as aforementioned. When voltage is removed from the line 28, capacitor 54 discharges through diode 72 and resistor 74 connected in series with capacitor 54 between voltage line 28 and ground. Resistor 74 will determine the rate at which capacitor 54 discharges upon termination of the timing cycle in order to reduce the duration of the next timing cycle if initiated before capacitor 54 is completely discharged.

It will therefore be apparent that the duration of each timing cycle will depend on the selected setting of control 32, which determines the rate at which capacitors 52 and 54 are charged, and the discharge state of capacitor 54 at the end of an off-time interval which affects the time it takes to reach the threshold voltage level at junction 58 causing termination of the timing cycle. By appropriate selection of the resistance values of resistors 62 and 64 determining the threshold voltage level and resistor 74 determining the delay in discharge of capacitor 54, the timer circuit 22 may be tailored to the heat saturation and dissipation characteristics of any given appliance model so as to minimize variation from the initial toast darkness selection made through the adjustment control 32 associated with the appliance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an electric load, a source of voltage, a manually operable power switch connected to said source, timer means connected to the power switch for intermittently energizing the load during timing cycles of limited duration between off-time intervals in response to actuation of the power switch, and adjustment means connected to the timer means for selecting the duration of said timing cycles, the improvement comprising capacitor means discharged between the timing cycles for establishing a voltage discharge level in the timer means, and means responsive to variations in the discharge level for reducing the selected duration of each of the timing cycles as an inverse function of the off-time intervals preceding the timing cycles.

2. The combination of claim 1 wherein said electrical load is a heater element of an electrical toaster.

3. The combination of claim 2 wherein said adjustment means is a toast darkness selector.

4. The combination of claim 3 wherein said timer means includes a timing capacitor charged from said source simultaneously with said energization of the load at a rate determined by the adjustment means in response to actuation of the power switch, and means responsive to establishment of a threshold voltage level of the timing capacitor for discharging said capacitor to deenergize the load.

5. In combination with an electrical toaster having a heater element, a source of voltage, a manually operable power switch connected to the source, timer means connected to the power switch for intermittently energizing the heater element during timing cycles of limited duration in response to actuation of the power switch, said timing cycles being spaced by off-time intervals during which the heater element is deenergized, and a toast darkness selector connected to the timer means for selecting the duration of said timing cycles, the improvement comprising capacitor means discharged during said off-time intervals between the timing cycles for establishing a voltage discharge level in the timer means, and means responsive to variations in the discharge level of the capacitor means for reducing the selected duration of each of the timing cycles as an inverse function of the off-time intervals preceding the timing cycles, said timer means including a timing capacitor charged from said source simultaneously with said energization of the heater element at a rate determined by adjustment of the toast darkness selector in response to actuation of the power switch, and means responsive to establishment of a threshold voltage level of the timing capacitor for discharging said capacitor to deenergize the heater element, said capacitor means including a second storage capacitor connected to the toast darkness selector, means for discharging the second storage capacitor in response to said deenergization of the heater element upon termination of one of the timing cycles, and means for delaying said discharge of the second storage capacitor to shorten the succeeding timing cycles.

6. In combination with an electric load, a source of voltage, a manually operable power switch connected to said source, timer means connected to the power switch for intermittently energizing the load during timing cycles of limited duration in response to actuation of the power switch, and adjustment means connected to the timer means for selecting the duration of said timing cycles, said timing cycles being spaced by off-time periods during which the load is deenergized, the improvement comprising capacitor means discharged during said off-time periods between the timing cycles for establishing a voltage discharge level in the timer means, and means responsive to variations in the discharge level of the capacitor means for reducing the selected durations of the timing cycles as an inverse function of the off-time periods preceding the timing cycles, said timer means including a timing capacitor charged from said source simultaneously with said energization of the load in response to actuation of the power switch, at a rate determined by the adjustment means, and means responsive to establishment of a threshold voltage level in the capacitor for discharging thereof independently of said capacitor means to deenergize the load.

7. The improvement as defined in claim 6 wherein said duration reducing means includes a second storage capacitor connected to the adjustment means, means for preventing discharge of the second storage capacitor during said discharge of the first mentioned capacitor means, means for discharging the second storage capacitor in response to said deenergization of the load upon termination of one of the timing cycles, and means for delaying said discharge of the second storage capacitor to shorten another of the timing cycles subsequently initiated.

8. In combination with an electrical appliance intermittently energized in response to actuation of a power switch, a timer device triggered into operation by said actuation of the power switch to establish on-time intervals during which the appliance is energized between off-time intervals of indeterminate duration, and automatic means connected to the timer device for varying the duration of said on-time intervals as an inverse function of the off-time intervals, comprising a storage capacitor charged to a threshold voltage level during the on-time intervals, means for discharging the storage capacitor from the threshold level in response to deenergization of the appliance by the timer device, and means for delaying said discharge of the storage capacitor to discharged levels determined by the duration of the off-time intervals.

9. The combination of claim 8 including adjustment means connected to the timer device for establishing a selected duration for the on-time intervals reduced by the automatic means.

10. In combination with an electrical appliance intermittently energized in response to actuation of a power switch, a timer device triggered into operation by said actuation of the power switch to establish on-time intervals during which the appliance is energized between off-time intervals, and automatic means connected to the timer device for varying the duration of said on-time intervals as an inverse function of the off-time intervals, comprising a storage capacitor charged to a threshold voltage level during the on-time intervals, means for discharging the storage capacitor from the threshold level in response to deenergization of the appliance by the timer device, and means for delaying said discharge of the storage capacitor to discharge levels determined by the duration of the off-time intervals, the timer device including a timing capacitor, and common junction means connecting the timing capacitor to the power switch in parallel with the storage capacitor for simultaneous charging during the timing cycles from the discharged levels to the threshold level.

11. The combination of claim 10 wherein the discharge delaying means comprises means for establishing a discharge path for the storage capacitor separate from the timing capacitor.

12. In combination with a heating element, a source of electrical energy, timer means for connecting the source to the heating element during timing cycles of limited duration, relay switch means responsive to termination of the timing cycles for disconnecting the heating element from the source during off-time intervals of indeterminate duration capacitor means for conditioning operation of the timer means in accordance with the duration of the off-time intervals preceding the timing cycles, delay means connected to the capacitor means for discharge thereof during the off-time intervals to a variable voltage charge level, and means responsive to said discharge of the capacitor means independently of the relay switch means to establish the duration of the timing cycles as a function of said variable charge level.

13. In combination with a heating element, a source of electrical energy, timer means connecting the source to the heating element for energization thereof during timing cycles of limited duration, relay switch means responsive to termination of the timing cycles for disconnecting the heating element from the source to maintain the heating element deenergized during off-time intervals between the timing cycles, and capacitor means for conditioning operation of the timer means in accordance with the duration of the off-time intervals preceding the timing cycles, the improvement comprising delay means connected to the capacitor means for discharge thereof during the off-time intervals to a variable voltage charge level, and means responsive to said discharge of the capacitor means for conditioning the timer means independently of the relay switch means to establish the duration of the timing cycles as a function of said variable charge level, said timer means including a timing capacitor, means connecting the source to the timing capacitor in parallel with the capacitor means for simultaneous charging from the variable charge level to a preset threshold voltage level during the timing cycles and means for discharging the timing capacitor independently of the capacitor means when the threshold level is exceeded to terminate the timing cycles.

* * * * *